UNITED STATES PATENT OFFICE 2,449,816

PLASTIC MATERIAL FROM ALLYL STARCH

Peter L. Nichols, Jr., and Robert M. Hamilton, Philadelphia, Pa., assignors to the United States of America as represented by the Secretary of Agriculture No Drawing. Application January 20, 1944, Serial No. 518,977

11 Claims. (Cl. 260—17.4)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to plastic materials produced from unsaturated ethers of carbohydrates compounded with sulfur, accelerators, and other compounding ingredients, and more particularly to such materials produced from allyl starch.

Among the objects of this invention is the preparation of a new plastic material of good solvent resistance, flexibility, toughness, and strength, from an unsaturated starch ether.

According to the present invention, organic solvent-soluble allyl starch is compounded with sulfur, accelerators and other compounding ingredients. The resulting material is characterized by the ease with which it may be handled. Like rubber, it exists in two states: the thermoplastic state, which is easy to process; and the "vulcanized" state, in which any degree of hardness up to hard rubber may be achieved. Heretofore, no satisfactory plastic materials have been produced from starch ethers.

Organic solvent-soluble allyl starch prepared by simultaneous deacetylation and etherification of starch acetate as described in our copending application for patent, Serial No. 518,976, filed January 20, 1944, now Patent Number 2,406,369, issued August 27, 1946, produces a highly satisfactory plastic material when compounded as described above. The application above described discloses that the organic solvent-soluble allyl starch is prepared by dissolving an acylated carbohydrate of any desirable degree of substitution in acetone or other suitable solvent. It is then heated at atmospheric pressure, or in an autoclave, in the presence of aqueous caustic alkali of suitable concentration and an unsaturated etherifying agent, such as allyl, crotyl, and cinnamyl halides. In this manner the starch acetate is simultaneously deacetylated and etherified, and an organic solvent-soluble product is obtained. The examples of the copending patent application cited above disclose that the product obtained by the use of the prescribed process contained from 1.3 to 2.4 inclusive, allyl groups per glucose unit. This solvent-soluble allyl starch is produced in two forms: a white powder, and a gummy semi-elastic mass. The latter may be compounded on a regular rubber mill and the former compounded by thoroughly blending the powdered materials. Both types may be cured at elevated temperatures (good results are obtained, for instance, at 80° to 160° C.) for short periods of time (5 to 30 minutes) to produce a flexible, solvent-resistant material of considerable tensile strength.

The following examples illustrate our invention:

Example I

| | Parts |
|---|---|
| Solvent-soluble gummy allyl starch | 10 |
| Mercaptobenzothiazole | 0.05 |
| ZnO | 0.50 |
| Stearic acid | 0.20 |
| S | 0.50 |
| Carbon black | 3.00 |
| Tetramethylthiuram disulphide | 0.10 |

The above mixture was compounded on a rubber mill, then cured for 5 minutes in a mold at 125° C. to form a slab 0.040 inch in thickness, having a tensile strength of about 1500 lbs./sq. inch.

Example II

Same as Example I, but solvent-soluble powdered allyl starch was used instead of the gummy form. The mixture was blended thoroughly and cured at 125° C. in a mold for 20 minutes to form a slab of 0.040 inch in thickness, of the same tensile strength as the sample of Example I.

Example III

| | Parts |
|---|---|
| Solvent-soluble gummy allyl starch | 10 |
| Mercaptobenzothiazole | 0.05 |
| ZnO | 0.50 |
| Stearic acid | 0.20 |
| S | 0.50 |
| Tetramethylthiuram disulphide | 0.10 |
| $TiO_2$ | 0.30 |
| Organic dye (Heliogen Green, Sudan Red, or any suitable dye) | 0.014 |

The above mixture was compounded, then cured as in Example I. Samples of various colors could be obtained, depending upon the dye added.

Example IV

The procedure outlined in Example III was carried out using solvent-soluble powdered allyl starch instead of gummy allyl starch. Similar products were obtained.

Having thus described our invention, we claim:
1. A plastic material comprising organic solvent-soluble allyl starch compounded and cured with sulfur.

2. A plastic material comprising organic solvent-soluble allyl starch compounded and cured with sulfur, in the presence of a dye.

3. A plastic material comprising organic solvent-soluble allyl starch compounded with sulfur, and cured at a temperature of about 80° to 160° C. for about 5 to 30 minutes.

4. A plastic material comprising organic solvent-soluble allyl starch containing at least 1.3 allyl groups per glucose unit, compounded and cured with sulfur.

5. A plastic material comprising organic solvent-soluble allyl starch containing at least 1.3 allyl groups per glucose unit, compounded and cured with sulfur, tetramethylthiuram disulphide and mercaptobenzothiazole in the presence of a dye.

6. A plastic material comprising organic solvent-soluble allyl starch containing at least 1.3 allyl groups per glucose unit, compounded with sulfur, carbon black, zinc oxide, stearic acid, tetramethylthiuram disulphide and mercaptobenzothiazole and cured at a temperature of about 80° to 160° C. for about five to thirty minutes.

7. A plastic material comprising organic solvent-soluble allyl starch, with a substitution of at least 1.3 allyl groups per glucose unit, compounded and cured with sulfur, carbon black, zinc oxide, stearic acid, tetramethylthiuram disulphide and mercaptobenzothiazole.

8. The process of preparing sulfurized allyl starch comprising curing a mixture of organic solvent soluble allyl starch, having at least 1.3 allyl groups per glucose unit, sulfur, and an organic vulcanization accelerator.

9. A sulfur modified plastic prepared by the process described in claim 8.

10. The process of claim 8 in which the accelerator is mercaptobenzothiazole and in which the mixture contains zinc oxide.

11. Vulcanized allyl starch prepared by sulfurizing an organic solvent-soluble allyl starch having at least 1.3 allyl groups per glucose unit.

PETER L. NICHOLS, Jr.
ROBERT M. HAMILTON.

REFERENCES CITED

The following references are of record in the file of this patent:

UNITED STATES PATENTS

| Number | Name | Date |
|---|---|---|
| 1,664,600 | Ellis | Apr. 3, 1928 |
| 1,877,854 | Hagedorn | Sept. 20, 1932 |
| 2,116,867 | Kreimeir | May 10, 1938 |
| 2,318,959 | Muskat | May 11, 1943 |
| 2,414,144 | Ernsberger | Jan. 14, 1947 |